(12) United States Patent
Kato et al.

(10) Patent No.: US 9,135,550 B2
(45) Date of Patent: Sep. 15, 2015

(54) WIRELESS IC DEVICE

(75) Inventors: Noboru Kato, Moriyama (JP); Yuya Dokai, Nagaokakyo (JP); Nobuo Ikemoto, Moriyama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 411 days.

(21) Appl. No.: 12/797,824

(22) Filed: Jun. 10, 2010

(65) Prior Publication Data
US 2010/0244215 A1 Sep. 30, 2010

Related U.S. Application Data

(63) Continuation of application No. 12/510,347, filed on Jul. 28, 2009, which is a continuation of application No. PCT/JP2008/057239, filed on Apr. 14, 2008.

(30) Foreign Application Priority Data

Apr. 27, 2007 (JP) ................................. 2007-120249

(51) Int. Cl.
*G06K 19/077* (2006.01)
(52) U.S. Cl.
CPC .... *G06K 19/07749* (2013.01); *G06K 19/07758* (2013.01); *G06K 19/07786* (2013.01)

(58) Field of Classification Search
USPC .......................................................... 235/492
See application file for complete search history.

(56) References Cited

U.S. PATENT DOCUMENTS

| 6,378,774 | B1* | 4/2002 | Emori et al. | 235/492 |
| 7,250,867 | B2* | 7/2007 | Sakama et al. | 340/572.7 |
| 2003/0218573 | A1* | 11/2003 | Yoo et al. | 343/702 |
| 2004/0125022 | A1* | 7/2004 | Fukushima et al. | 343/700 MS |
| 2005/0134460 | A1* | 6/2005 | Usami | 340/572.7 |
| 2005/0275539 | A1* | 12/2005 | Sakama et al. | 340/572.7 |

OTHER PUBLICATIONS

Kato et al.; "Wireless IC Device"; U.S. Appl. No. 12/510,347, filed Jul. 28, 2009.

* cited by examiner

*Primary Examiner* — Michael G Lee
*Assistant Examiner* — David Tardif
(74) *Attorney, Agent, or Firm* — Keating & Bennett, LLP

(57) ABSTRACT

A wireless IC device includes a radiating plate, a wireless IC chip, and a feeder circuit board, on which the wireless IC chip is mounted. The feeder circuit board includes a resonant circuit with an inductance element, and the resonant circuit is electromagnetically coupled with the radiating plate. The wireless IC chip is interposed between the radiating plate and the feeder circuit board.

9 Claims, 3 Drawing Sheets

WIRELESS IC DEVICE

BACKGROUND OF THE INVENTION

1. Field of the Invention

The present invention relates to wireless IC devices, and in particular, relates to wireless IC devices such as non-contact wireless IC media and non-contact wireless IC tags used in, for example, Radio Frequency Identification (RFID) systems.

2. Description of the Related Art

To date, various wireless IC devices on which wireless IC chips are mounted have been proposed.

Japanese Unexamined Patent Application Publication No. 2002-298109, for example, discloses a non-contact wireless IC medium produced by the following steps. First, as shown in a cross-sectional view in FIG. 4A, an antenna portion 103 is formed on a separable sheet 101 using conductive paste, conductive ink, or the like, and an IC chip 109 is mounted on the antenna portion 103 so as to be electrically connected to the antenna portion 103. Next, as shown in a cross-sectional view in FIG. 4B, an adhesive sheet 111 is closely adhered to the antenna portion 103 and the IC chip 109. Finally, as shown in a cross-sectional view in FIG. 4C, the separable sheet 101 is stripped off.

The non-contact wireless IC medium is used while the adhesive sheet 111 is adhered to an article and the IC chip 101 is exposed to the outside. Therefore, when the article to which the non-contact wireless IC medium is adhered is brought into contact with other articles, the shock can directly act on the IC chip 109, and the IC chip 109 can be damaged. This can lead to malfunction of the wireless IC medium.

SUMMARY OF THE INVENTION

Accordingly, the present invention provides a wireless IC device including a wireless IC chip having a structure that prevents a shock from the outside, for example, from being applied directly on the wireless IC chip.

According to a preferred embodiment of the present invention, a wireless IC device includes a radiating plate, a wireless IC chip, and a feeder circuit board on which the wireless IC chip is mounted, the feeder circuit board including a feeder circuit having a resonant circuit with an inductance element and/or a matching circuit, the feeder circuit being electromagnetically coupled with the radiating plate. The wireless IC chip is interposed between the radiating plate and the feeder circuit board.

With the above-described structure, the wireless IC chip is not used while being exposed to the outside. Thus, shock from the outside, for example, acts on the wireless IC chip via the radiating plate or the feeder circuit board. Since the shock from the outside, for example, does not directly act on the wireless IC chip, the wireless IC chip is prevented from being damaged or being made inoperable.

It is preferable that the radiating plate and the feeder circuit board be joined to each other at a periphery of the wireless IC chip when viewed in a direction perpendicular or substantially perpendicular to a surface of the feeder circuit board on which the wireless IC chip is mounted.

In this case, the radiating plate and the feeder circuit board can be joined together while being in contact with each other or via an adhesive or other suitable joining material or member. Since the periphery of the wireless IC chip is covered with the radiating plate and/or the feeder circuit board, water or the like is prevented from infiltrating into the wireless IC chip, resulting in an improvement in the reliability of the wireless IC device.

Moreover, since the distance between the radiating plate and the feeder circuit board is reduced, the efficiency of electromagnetic coupling is improved, and size reduction of the device, for example, is facilitated.

It is preferable that the radiating plate be adhered to an article at a surface remote from the feeder circuit board and the wireless IC chip.

In this case, the wireless IC chip in the wireless IC device adhered to the article is located at an outer position of the radiating plate. However, the wireless IC chip is covered with the feeder circuit board, and is protected.

It is preferable that the wireless IC device further include a resin component disposed between the radiating plate and the feeder circuit board at least the periphery of the wireless IC chip when viewed in the direction perpendicular or substantially perpendicular to the surface of the feeder circuit board on which the wireless IC chip is mounted.

In this case, at least the periphery of the wireless IC chip is surrounded by the resin component, water or the like is prevented from infiltrating into the wireless IC chip, resulting in an improvement in the reliability of the wireless IC device.

Another resin component can also be disposed between the radiating plate and the wireless IC chip such that a surface, remote from the feeder circuit board, of the wireless IC chip is covered.

It is preferable that the wireless IC chip be electrically insulated from the radiating plate.

It is preferable that at least one of the radiating plate and the feeder circuit board be formed of a flexible substrate.

In this case, the wireless IC device can be produced continuously and efficiently using the flexible substrate, and the size thereof can also be reduced easily. Moreover, the feeder circuit board and/or the radiating plate can be formed such that the wireless IC device is adhered to a curved surface of an article or such that the wireless IC chip is covered.

It is preferable that the wireless IC chip be in contact with the radiating plate at a surface remote from the feeder circuit board.

In this case, the height of the wireless IC device can be reduced by removing the gap between the wireless IC chip and the radiating plate.

When a radiating-electrode pattern is formed on a base of the radiating plate, the wireless IC chip may be brought into contact with the radiating-electrode pattern or the base.

According to various preferred embodiments of the present invention, shock from the outside, for example, does not directly act on the wireless IC chip. Thus, the wireless IC chip is prevented from being damaged or being made inoperable, resulting in an improvement in the reliability of the wireless IC device.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Preferred embodiments of the present invention will now be described with reference to FIGS. 1A to 3.

First Preferred Embodiment

Figure 1A:
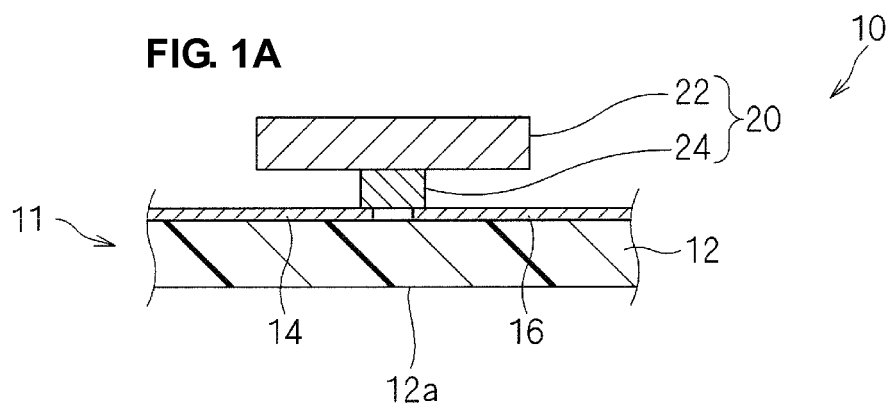
FIGS. 1A, 1B and 1C are cross-sectional views of a principal portion of a wireless IC device according to a first preferred embodiment of the present invention.

A wireless IC device according to a first preferred embodiment will be described with reference to FIGS. 1A to 2. FIGS. 1A to 1C are cross-sectional views of a principal portion of the wireless IC device.

As shown in FIG. 1A, a wireless IC device 10 includes a radiating plate 11 and an electromagnetically coupled module 20 mounted thereon. The radiating plate 11 includes a base 12 and radiating-electrode patterns 14 and 16 located thereon. The electromagnetically coupled module 20 includes a feeder circuit board 22 and a wireless IC chip 24 mounted thereon.

The wireless IC chip 24 is disposed between the radiating plate 11 and the feeder circuit board 22. In order to realize a low-profile device by removing the gap between the wireless IC chip 24 and the radiating plate 11, the wireless IC chip 24 is in contact with the radiating-electrode patterns 14 and 16 or the base 12 of the radiating plate 11.

Although the radiating plate 11 and the feeder circuit board 22 are spaced apart from each other, these components are electromagnetically coupled (via an electric field, a magnetic field, or both electric and magnetic fields). For example, the feeder circuit board 22 is preferably formed of, for example, a multilayer substrate or a flexible substrate, and an inductance element is disposed inside or outside the feeder circuit board 22 such that magnetic fields generated by the inductance element and the radiating plate 11 are coupled.

Since a portion of the feeder circuit board 22 protruding from the wireless IC chip 24 directly faces the radiating plate 11, the electromagnetic coupling between the feeder circuit board 22 and the radiating plate 11 can be facilitated by forming a wiring electrode of the inductance element on the protruding portion.

However, since the wireless IC chip 24 is a dielectric formed on, for example, a silicon substrate and electromagnetic waves can pass therethrough, the inductance element can be formed on a portion of the feeder circuit board 22 overlapped with the wireless IC chip 24.

Since the radiating plate 11 and the feeder circuit board 22 are electromagnetically coupled and the wireless IC chip and the radiating plate 11 are not electrically connected, current does not flow from the radiating plate 11 to the wireless IC chip 24 even when static electricity is generated in the radiating plate 11. That is, the portion at which the radiating plate 11 and the feeder circuit board 22 are electromagnetically coupled is designed for high-frequency application, and static electricity, which is an energy wave whose frequency is less than or equal to approximately 200 MHz, does not flow through the portion. Consequently, the wireless IC chip 24 is not easily broken or damaged by static electricity.

Since it is not necessary for the feeder circuit board 22 and the radiating plate 11 to be electrically connected, the electromagnetically coupled module 20 can be mounted on the base 12 using an insulating adhesive, for example. Various types of components, for example, metal foil or evaporated electrodes can be used for the radiating plate 11. In this manner, the material can be freely selected depending on the application of the wireless IC device 10.

A feeder circuit including a resonant circuit with a predetermined resonant frequency is embedded in the feeder circuit board 22. In the present invention, the predetermined resonant frequency refers to an operating frequency at which the electromagnetically coupled module 20 operates as a wireless IC device. The feeder circuit matches characteristic impedances of the radiating plate 11 and the wireless IC chip 24. Moreover, the radiating plate 11 radiates transmitted signals supplied from the feeder circuit board 22 via electromagnetic coupling into the air, and supplies received signals to the feeder circuit via electromagnetic coupling.

The wireless IC chip 24 is interposed between the feeder circuit board 22 and the radiating plate 11 and is protected. That is, shock from the outside, for example, acts on the wireless IC chip 24 via the feeder circuit board 22 or the radiating plate 11, and does not directly act on the wireless IC chip 24.

Figure 1B:
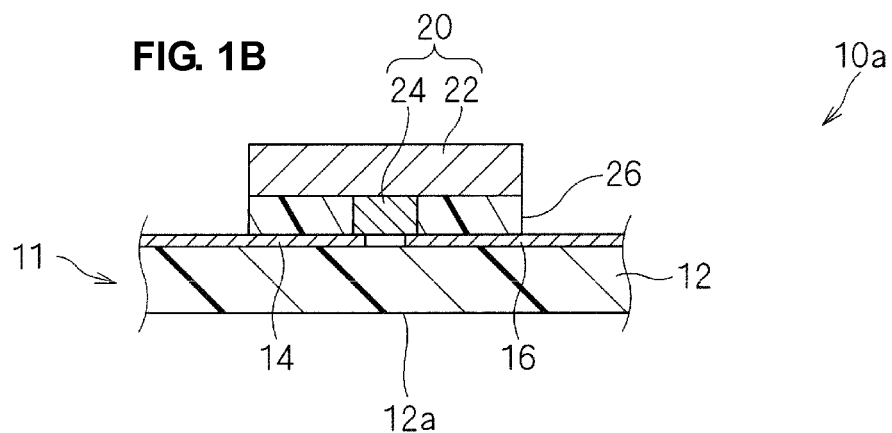

As in a wireless IC device 10a shown in FIG. 1B, a molded resin component 26 can be disposed between the portion of the feeder circuit board 22 protruding from the wireless IC chip 24 and the radiating plate 11 so as to surround the wireless IC chip 24. Furthermore, although not shown, the radiating plate 11 and the wireless IC chip 24 can be spaced apart from each other, and another molded resin component can be interposed between the radiating plate 11 and the wireless IC chip 24.

The molded resin component 26 surrounding the wireless IC chip 24 can prevent water or the like from infiltrating into the wireless IC chip 24, resulting in an improvement in the reliability of the wireless IC device 10a.

Figure 1C:
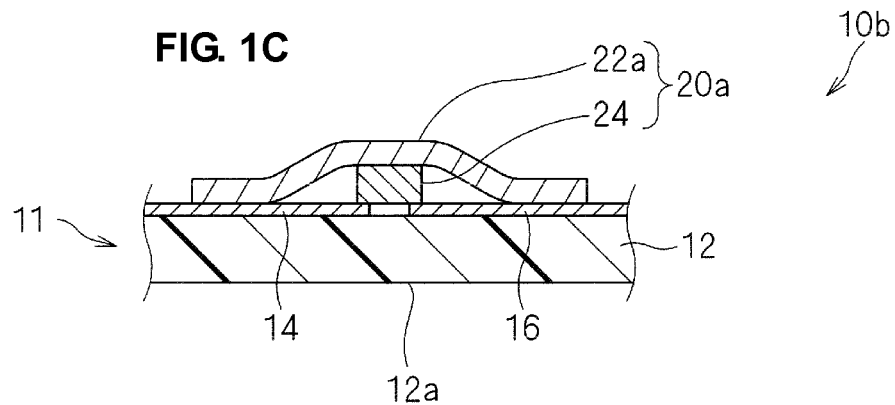

As in a wireless IC device 10b shown in FIG. 1C, a portion of a feeder circuit board 22a protruding from the wireless IC chip can be joined to the radiating plate 11 along the side surfaces of the wireless IC chip 24 so as to surround the wireless IC chip 24. The feeder circuit board 22a can be in contact with the radiating-electrode patterns 14 and 16, or can be spaced apart from the radiating-electrode patterns 14 and 16. The feeder circuit board 22a can be easily formed when a flexible substrate, for example, is used for the feeder circuit board 22a.

Since the distance between the radiating plate 11 and the feeder circuit board 22a is reduced, the efficiency of electromagnetic coupling is improved, and size reduction of the device, for example, is facilitated.

The wireless IC devices 10, 10a, and 10b are each used while a surface 12a, remote from the electromagnetically coupled modules 20 and 20a, of the base 12 included in the radiating plate 11 is adhered to an article.

Figure 2:
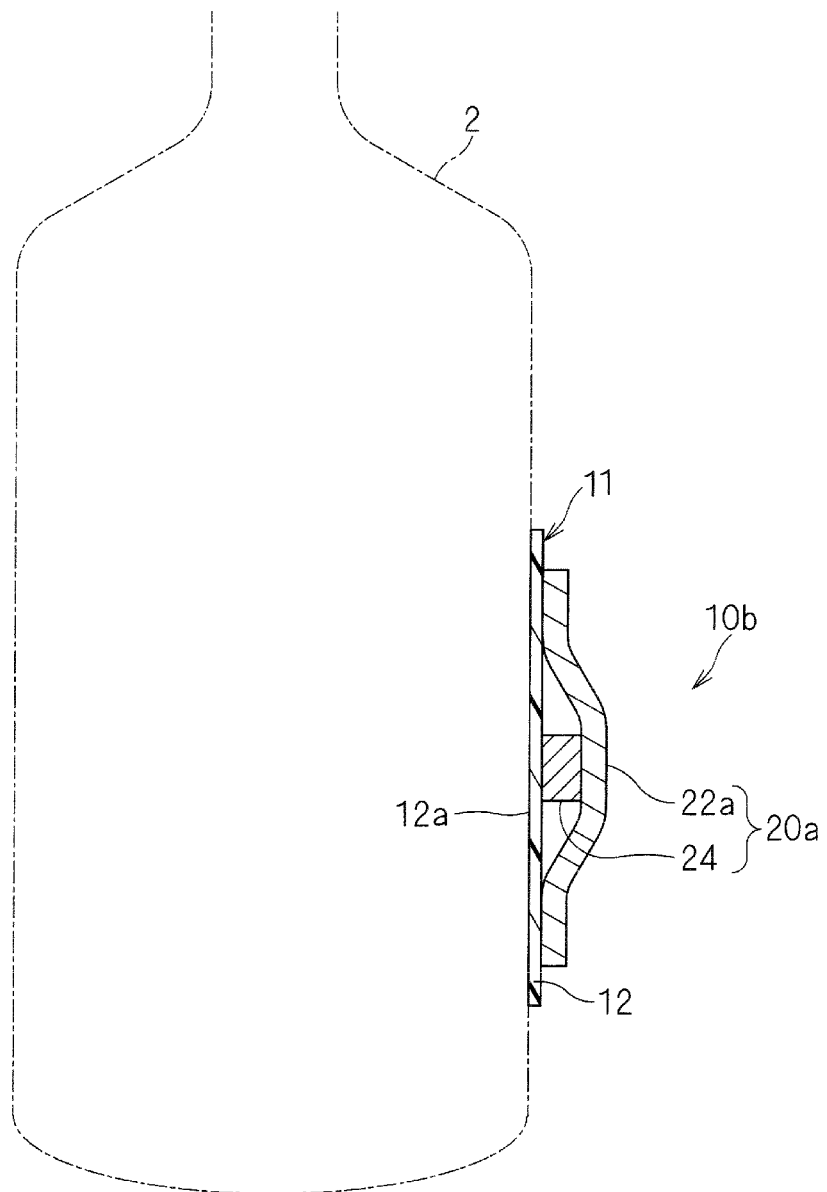
FIG. 2 is a cross-sectional view when the wireless IC device is in use according to the first preferred embodiment of the present invention.

For example, as shown in a cross-sectional view in FIG. 2, the wireless IC device 10b is used while the surface 12a, which is remote from the electromagnetically coupled module 20a, of the base 12 included in the radiating plate 11 is adhered to an article 2, and the electromagnetically coupled module 20a is exposed to the outside. At this time, the wireless IC chip 24 is interposed between the radiating plate 11 and the feeder circuit board 22a and covered with the feeder circuit board 22a so as not to be exposed to the outside. Thus, the wireless IC chip 24 is protected from, for example, shock from the outside.

When the article 2 to which the wireless IC device 10b is adhered is a metal product such as an aluminum bottle, signals are radiated from the radiating plate 11 to the metal, and the metal product itself functions as a radiator. When the article 2 is an insulator such as a plastic bottle, the insulator itself can also function as a radiator by setting the impedance of a matching circuit in the feeder circuit board 22a so as to be the same as that determined by the dielectric constant of the insulator.

In FIG. 2, the radiating-electrode patterns formed on the base 12 are not shown. However, the radiating-electrode patterns can be formed on a surface of the base 12 adjacent to the electromagnetically coupled module 20a or on the surface 12a adjacent to the article 2. In particular, when the radiating-electrode patterns are formed on the surface 12a adjacent to the article 2, electromagnetic waves radiated from the radiating-electrode patterns can be efficiently transmitted to the article 2.

When a flexible substrate is used for the radiating plate 11, the wireless IC devices 10, 10a, and 10b can be easily adhered to, for example, curved surfaces of the article 2. Moreover, the wireless IC devices can be produced continuously and efficiently, and the size thereof can also be reduced easily.

Second Preferred Embodiment

Figure 3:
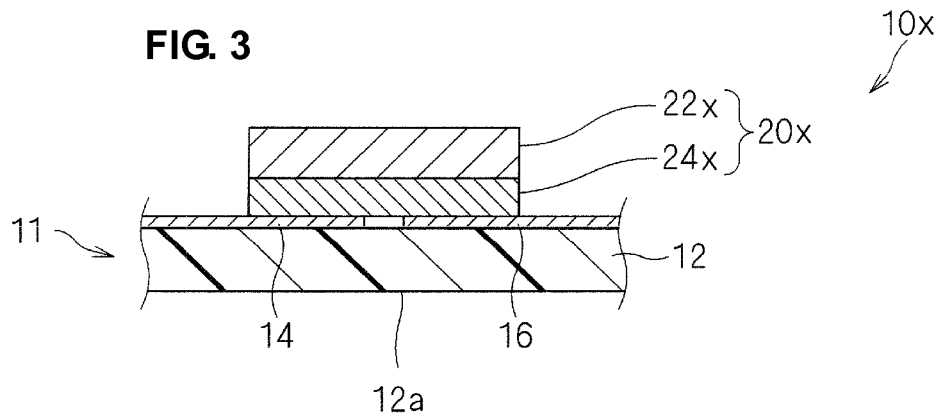
FIG. 3 is a cross-sectional view of a principal portion of a wireless IC device to a second preferred embodiment of the present invention.
Figure 4A:
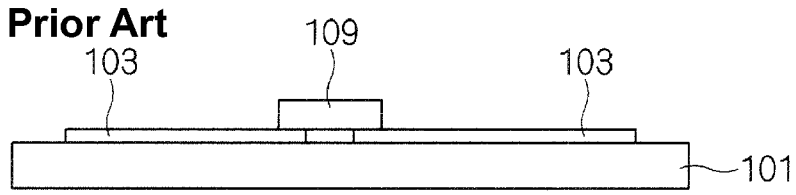
FIGS. 4A, 4B and 4C are cross-sectional views illustrating a production process of a known wireless IC device.
Figure 4B:
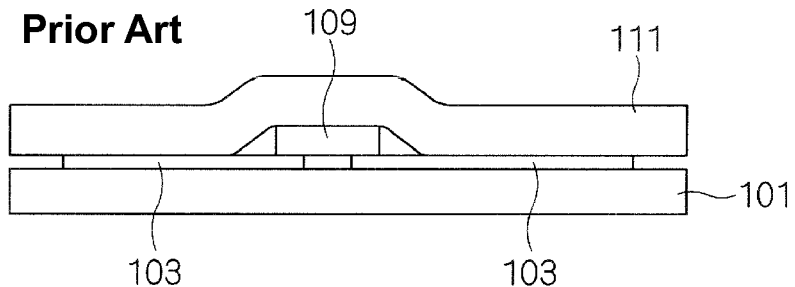
Figure 4C:
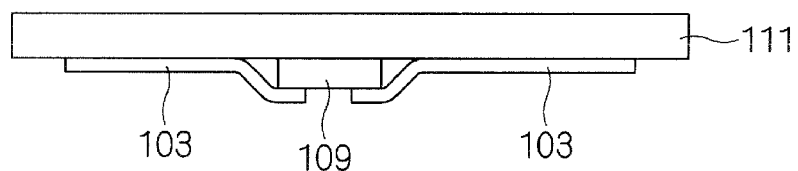

A wireless IC device 10x according to a second preferred embodiment will now be described with reference to a cross-sectional view of a principal portion shown in FIG. 3.

The wireless IC device 10x according to the second preferred embodiment includes a radiating plate 11 having a base 12 and radiating-electrode patterns 14 and 16 located thereon and an electromagnetically coupled module 20x mounted on the radiating plate 11 using an adhesive or other suitable joining material or member, as in the first preferred embodiment.

Unlike the first preferred embodiment, the sizes and the dimensions of a feeder circuit board 22× and a wireless IC chip 24x of the electromagnetically coupled module 20x are substantially the same, and the feeder circuit board 22x does not have a portion protruding from the wireless IC chip 24x.

Since the wireless IC chip 24x is a dielectric formed on, for example, a silicon substrate and electromagnetic waves can pass therethrough, the electromagnetic field can be expanded in the thickness direction of the wireless IC chip 24x, and the feeder circuit board 22× and the radiating-electrode patterns 14 and 16 can be electromagnetically coupled via the wireless IC chip 24x.

As in the first preferred embodiment, the wireless IC chip 24x in the wireless IC device 10x according to the second preferred embodiment is also protected from, for example, static electricity and shock from the outside.

As described above, shock from the outside, for example, does not directly act on the wireless IC chip since the wireless IC chip is interposed between the feeder circuit board and the radiating plate. In this manner, the wireless IC chip is prevented from being damaged or being made inoperable, resulting in an improvement in the reliability of the wireless IC device.

Moreover, since the radiating plate and the feeder circuit board are electromagnetically coupled and the wireless IC chip and the radiating plate are not electrically connected, the wireless IC chip is not broken or damaged by the static electricity generated in the radiating plate. In this manner, countermeasures against static electricity can be enhanced.

The present invention is not limited to the above-described preferred embodiments, and various modifications are possible.

For example, the radiating plate and the feeder circuit board can be electromagnetically coupled using only an electric field or only a magnetic field instead of using electromagnetic waves.

Moreover, the feeder circuit of the feeder circuit board can include (a) a matching circuit in addition to the resonant circuit including the inductance element, (b) a matching circuit but not the resonant circuit including the inductance element, or (c) the resonant circuit including the inductance element but not a matching circuit.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A wireless IC device comprising:
   a radiating plate;
   a wireless IC chip including first and second opposed main surfaces extending substantially parallel to one another and a side surface extending substantially perpendicular to and between the first and second opposed main surfaces; and
   a feeder circuit board including a surface on which the wireless IC chip is mounted, and a feeder circuit that includes an inductance element, the inductance element being electromagnetically coupled with the radiating plate; wherein
   the wireless IC chip is directly mounted to the feeder circuit board between the radiating plate and the feeder circuit board;
   the feeder circuit board includes a flexible substrate;
   the feeder circuit board includes a first portion that extends over one of the first and second opposed main surfaces of the wireless IC chip and a second portion that extends from the first portion and surrounds the side surface of the wireless IC chip;
   the second portion of the feeder circuit board is in contact with the radiating plate, such that the feeder circuit board covers the wireless IC chip; and
   at least a portion of the inductance element included in the feeder circuit board is arranged closer to the radiating plate than a portion of the surface of the feeder circuit board at which the wireless IC chip is mounted.

2. The wireless IC device according to claim 1, wherein the feeder circuit board includes a multilayer substrate, and the inductance element is disposed inside the multilayer substrate.

3. The wireless IC device according to claim 1, wherein the radiating plate and the feeder circuit board are joined to each other at a periphery of the wireless IC chip when viewed in a direction perpendicular or substantially perpendicular to a surface of the feeder circuit board on which the wireless IC chip is mounted.

4. The wireless IC device according to claim 1, wherein the radiating plate is adhered to an article at a surface remote from the feeder circuit board and the wireless IC chip.

5. The wireless IC device according to claim 1, further comprising a resin component disposed between the radiating plate and the feeder circuit board at at least a periphery of the wireless IC chip when viewed in a direction perpendicular or substantially perpendicular to a surface of the feeder circuit board on which the wireless IC chip is mounted.

6. The wireless IC device according to claim 1, wherein the wireless IC chip is electrically insulated from the radiating plate.

7. The wireless IC device according to claim 1, wherein the radiating plate is made of a flexible substrate.

8. The wireless IC device according to claim 1, wherein the wireless IC chip is in contact with the radiating plate at a surface remote from the feeder circuit board.

9. The wireless IC device according to claim 1, further comprising a molded resin component which is interposed between the radiating plate and the wireless IC chip.

* * * * *